(12) United States Patent
Zhang et al.

(10) Patent No.: US 10,279,658 B2
(45) Date of Patent: May 7, 2019

(54) VEHICLE VOC REDUCTION SYSTEM

(71) Applicant: FORD GLOBAL TECHNOLOGIES, LLC, Dearborn, MI (US)

(72) Inventors: Kadin Zhang, Nanjing (CN); Murphy Yang, Nanjing (CN)

(73) Assignee: Ford Global Technologies, LLC, Dearborn, MI (US)

(*) Notice: Subject to any disclaimer, the term of this patent is extended or adjusted under 35 U.S.C. 154(b) by 419 days.

(21) Appl. No.: 14/847,282

(22) Filed: Sep. 8, 2015

(65) Prior Publication Data

US 2016/0089960 A1    Mar. 31, 2016

(30) Foreign Application Priority Data

Sep. 29, 2014    (CN) .......................... 2014 1 0514564

(51) Int. Cl.
*B01D 53/02* (2006.01)
*B60H 3/00* (2006.01)
*B01D 53/04* (2006.01)
*B60H 3/06* (2006.01)
*B01D 53/30* (2006.01)

(52) U.S. Cl.
CPC ........... *B60H 3/0085* (2013.01); *B01D 53/04* (2013.01); *B01D 53/0407* (2013.01); *B01D 53/0454* (2013.01); *B60H 3/06* (2013.01); *B01D 53/30* (2013.01); *B01D 2253/102* (2013.01); *B01D 2253/104* (2013.01); *B01D 2253/106* (2013.01); *B01D 2257/708* (2013.01); *B01D 2259/4508* (2013.01); *B01D 2259/4566* (2013.01); *B60H 2003/0683* (2013.01); *Y02A 50/235* (2018.01)

(58) Field of Classification Search
CPC ........ B01D 2253/102; B01D 2253/104; B01D 2253/106; B01D 2257/708; B01D 2259/4508; B01D 2259/4566; B01D 53/04; B01D 53/0407; B01D 53/0454; B01D 53/30; B60H 2003/0683; B60H 2003/0085; B60H 2003/06
See application file for complete search history.

(56) References Cited

U.S. PATENT DOCUMENTS

| | | | |
|---|---|---|---|
| 4,658,707 A | 4/1987 | Hawkins et al. | |
| 4,722,747 A | 2/1988 | Armbruster | |
| 5,221,292 A | 6/1993 | Aoyama | |
| 5,775,415 A * | 7/1998 | Yoshimi | B60H 1/00821 165/202 |
| 5,938,523 A | 8/1999 | Khelifa et al. | |
| 6,319,484 B1 * | 11/2001 | Shore | B01D 53/869 422/173 |
| 6,773,477 B2 | 8/2004 | Lindsay | |
| 6,941,193 B2 | 9/2005 | Frecska et al. | |

(Continued)

FOREIGN PATENT DOCUMENTS

| | | |
|---|---|---|
| CN | 101001768 A | 7/2007 |
| CN | 203837174 U | 9/2014 |
| EP | 1772181 | 2/2010 |

*Primary Examiner* — Christopher P Jones
(74) *Attorney, Agent, or Firm* — Alice Xu; Kolitch Romano LLP

(57) ABSTRACT

In one or more embodiments, a vehicle VOC reduction system includes a VOC reducer to be in fluid communication with cabin air, a rechargeable battery unit at least partially powering the VOC reducer, and a transmitter to transmit commands to operate the VOC reducer.

18 Claims, 4 Drawing Sheets

(56) References Cited

U.S. PATENT DOCUMENTS

| | | | |
|---|---|---|---|
| 8,172,925 B2 | 5/2012 | Sugawara | |
| 8,252,099 B2 | 8/2012 | Worrilow | |
| 2002/0172633 A1* | 11/2002 | Koermer | B01D 53/06 423/219 |
| 2007/0032186 A1* | 2/2007 | Clark | B01D 46/0023 454/158 |
| 2008/0041138 A1* | 2/2008 | Marra | B60H 1/008 73/31.02 |
| 2010/0298981 A1 | 11/2010 | Chamorro et al. | |

* cited by examiner

VEHICLE VOC REDUCTION SYSTEM

RELATED APPLICATION(S)

This application claims the benefit of Chinese New Invention Patent Application No.: CN201410514564.7, filed on Sep. 29, 2014, the entire contents thereof being incorporated herein by reference.

TECHNICAL FIELD

The present invention in one or more embodiments relates to a Volatile Organic Compounds (VOC) reduction system for vehicle.

BACKGROUND

In certain if not most vehicles, and new vehicles in particular, certain interior parts of the vehicle often give off VOC. These interior parts include interior trims such as seats, headliners, and trim panels. In order to solve this issue, many drivers place for example activated carbon packages inside the vehicle, hoping to reduce the VOC concentration via carbon absorption.

Certain automatic air purifier may be available to purify the air in cabin, which utilizes a fan driven by electric motor to intake air through smoke filter. The air purifier is driven by the vehicle power system. The operation of the purifier is initiated upon detection of smoke, and continues its operation for a predetermined time interval following the last detection of smoke. For example, U.S. Pat. No. 4,658,707 discloses similar systems.

SUMMARY

According to one or more embodiments, a VOC reduction system for a vehicle includes a VOC reducer to be in fluid communication with cabin air, a rechargeable battery unit at least partially powering the VOC reducer, and a transmitter to transmit commands to operate the VOC reducer.

The rechargeable battery unit may be in electrical connection with a generator of the vehicle. The VOC reducer may be also in electrical connection with a generator of the vehicle directly. The VOC reducer may include one or more fan blade, an air inlet, and a VOC absorber positioned at least partially between the one or more fan blade and the air inlet. The VOC absorber may include a replaceable VOC absorbing layer. The VOC reducer may further include a housing to enclose therein the one or more fan blades and the VOC absorber. The transmitter may be a hand-held device separable from the vehicle. The transmitter may be positioned on a key fob of the vehicle. The VOC reduction system may further comprise at least one VOC sensor detecting the VOC in the vehicle. The VOC reduction system may further comprise a signal output unit in communication with the VOC sensor and providing VOC concentration signal to the VOC reducer.

The VOC reduction system may further include a connector to connect at least one of the VOC reducer and the VOC sensor to a roof of the vehicle. The VOC reduction system may further include a connector to connect at least one of the VOC reducer and the VOC sensor to a B pillar of the vehicle. The VOC reduction system may further include a connector to connect at least one of the VOC reducer and the VOC sensor to an air outlet of an air conditioner of the vehicle.

One or more advantageous features as described herein elsewhere will be readily apparent from the following detailed description of embodiments when taken in connection with the accompanying drawings.

BRIEF DESCRIPTION OF THE DRAWINGS

For a more complete understanding of one or more embodiments of this invention, reference should now be made to the embodiments illustrated in greater detail in the accompanying drawings and described below by way of examples wherein.

DETAILED DESCRIPTION OF ONE OR MORE EMBODIMENTS

Figure 1A:
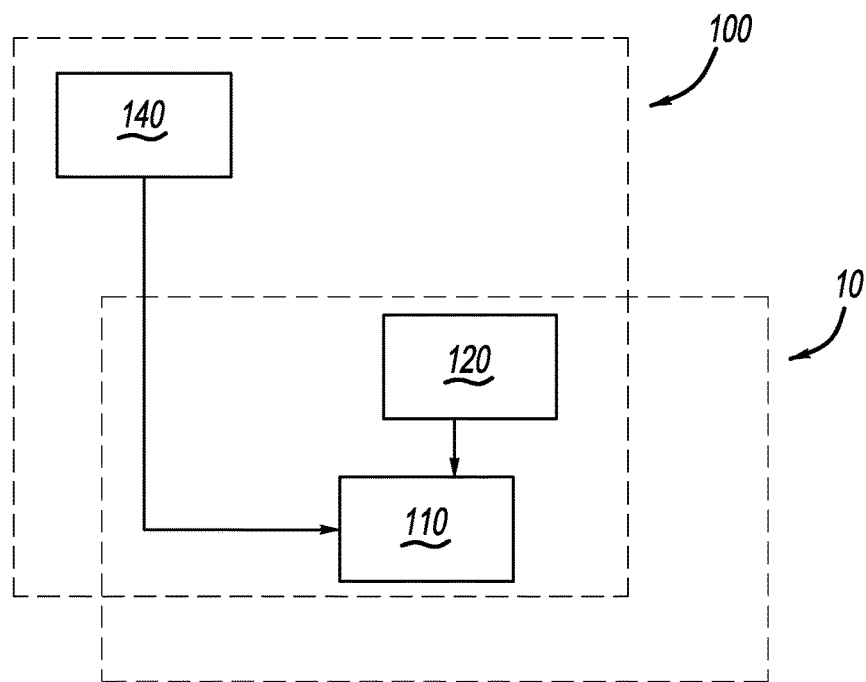
FIG. 1A illustratively depicts a block view of a VOC reduction system as applicable to a vehicle according to one or more embodiments.

As referenced in the FIG.s, the same reference numerals are used to refer to the same components. In the following description, various operating parameters and components are described for different constructed embodiments. These specific parameters and components are included as examples and are not meant to be limiting.

As will be detailed herein elsewhere, the present invention in one or more embodiments is advantageous at least by providing a VOC reduction system for vehicle, such that the VOC in cabin air may be reduced or eliminated even when the vehicle is not in active operation, and the VOC reduction processes do not necessarily have to affect the otherwise normal operation of the vehicle.

FIG. 1A illustratively depicts a VOC reduction system generally shown at 100 for a vehicle 10 according to one or more embodiment. The VOC reduction system 100 includes a VOC reducer 110 in fluid communication with cabin air (not shown), a rechargeable battery unit 120 at least partially powering the VOC reducer 110, and a transmitter 140 capable of transmitting operation commands to the VOC reducer 110. In certain embodiments, the rechargeable battery unit 120 may be or include rechargeable battery pack with suitable structure and functionality.

In certain embodiments, the transmitter 140 may transmit various operating commands, including those for starting and terminating operations of the VOC reducer 110. Upon the receipt of a start command, the VOC reduction system 100 may start an operation of VOC reduction of cabin air in the vehicle 10. Similarly, an operator may send a stop command via the transmitter 140, thereby the VOC reduction system 100 may stop its operation accordingly.

The transmitter 140 may be positioned inside and/or outside of the vehicle 10 for easy access. For instance, the transmitter 140 may be positioned on or near the central console (not shown) or any other suitable easy-to-reach locations of the vehicle. For instance also, the transmitter 140 may be positioned on an exterior surface of the vehicle 10, in particular at or near a key entry of the driver side and/or the passenger side. For instance also, the transmitter 140 may be configured as a hand-held device that is part of a vehicle key such as a remote keyless entry controller (not shown) for the vehicle 10, or as a stand-alone device separate from the vehicle key. In this way, the driver may remotely control the operation of the VOC reduction system 100 relatively at ease.

Referring back to FIG. 1A, the rechargable battery unit 120 provides the electrical force for the VOC reducer 110. As is further detailed herein elsewhere, the present invention in one or more embodiments is thus advantageous in at least providing a VOC reduction system such as the VOC reduction system 100 where the VOC reducer 110 is operable via the rechargable battery unit 120 that is optionally independent of a built-in power system of the vehicle 10. In this configuration, the VOC reducer 110 may be turned on and off via the rechargable battery unit 120 without any otherwise necessary electrical support from the vehicle 110 itself, such as when the vehicle 10 is parked and not running. This can be readily handy and sometimes particularly useful when a passenger is present alone in the vehicle 10 and a VOC reduction need arises without the driver or the ignition key to the vehicle 10.

Figure 1B:
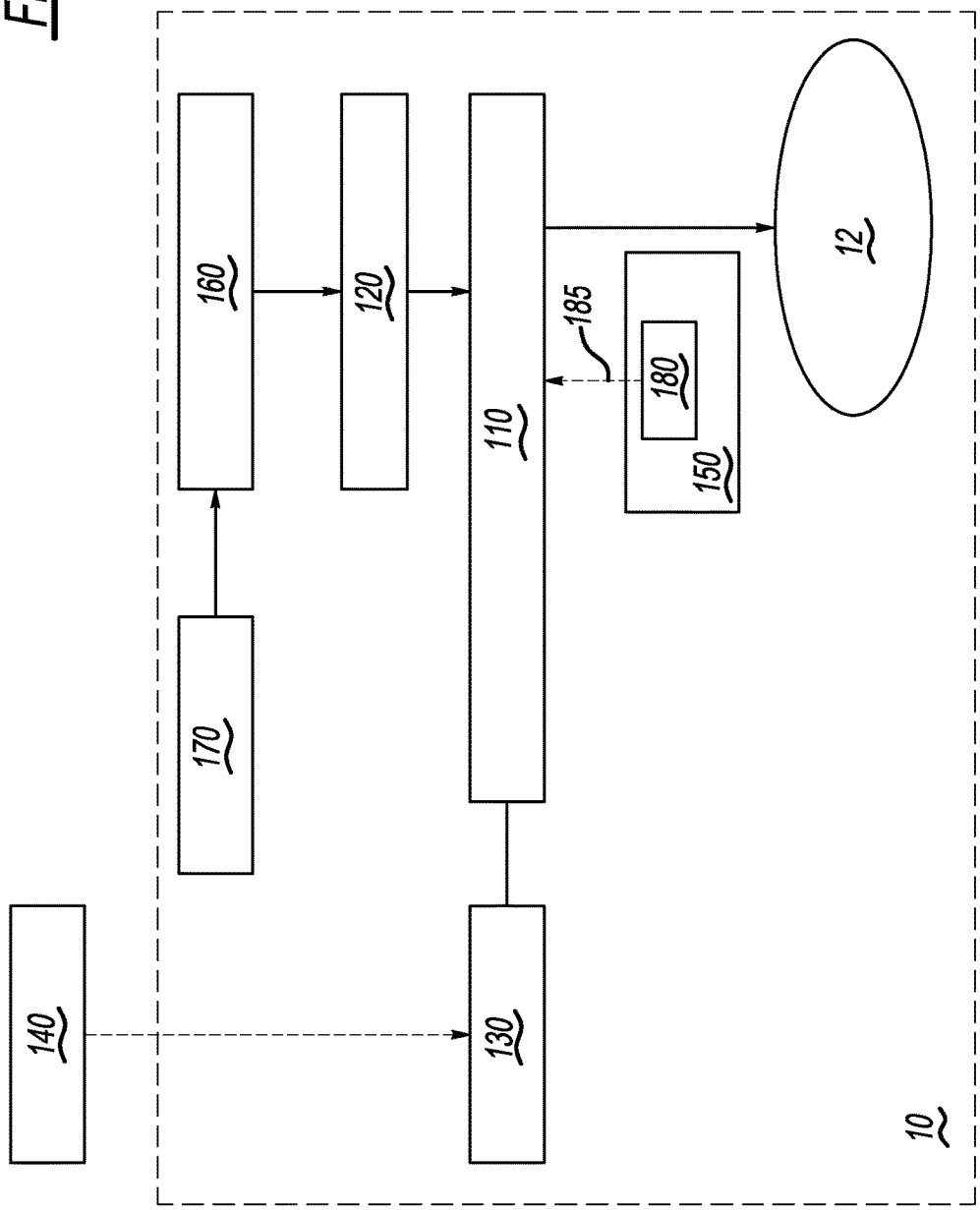
FIG. 1B illustratively depicts another block view of the VOC reduction system as referenced in FIG. 1A.

FIG. 1B illustratively depicts another block view of the VOC reduction system 100 in relation to the vehicle 10. As shown in FIG. 1B, the VOC reducer 110 may be electrically connected to the rechargeable battery unit 120. In this way, the rechargeable battery unit 120 may directly provide power to operating the VOC reducer 110. As mentioned in relation to FIG. 1A, the rechargeable battery unit 120 may be separate from a general electric system of the vehicle 10. That is, the rechargeable battery 120 may be separate and independent from the vehicle storage battery onboard of the vehicle 10. In other words, the vehicle 10 may include both the rechargeable battery unit 120 and the vehicle internal storage battery. Therefore the VOC reduction system 100 may continue operating with or without the engine running. Because the VOC reduction system 100 may be operable via the power input from the rechargeable battery unit 120, risks associated vehicle battery power outage due to extended running of the VOC reduction system 100 may not necessarily have any substantive impact on the operation of the VOC reducer 110.

Referring back to FIG. 1B, optionally the rechargeable battery unit 120 may be connected to a generator 160 of the vehicle 10. Further, the generator 160 may be driven by an engine 170. When the driver starts the engine 170, the generator 160 converts the motive energy from the engine 170 into electric energy, and charges the rechargeable battery unit 120. In this way, the VOC reduction system 100 may remain in operation for a relatively long time. Even when the rechargeable battery unit 120 is out of charge due to extended running of the rechargeable battery unit 120, the operation of vehicle 10 is not likely compromised because the engine 170 may still be started via the vehicle storage battery, and the VOC reduction system 100 may continue to operate normally once the rechargeable battery 120 is recharged via the generator 160. In another embodiment, the rechargeable battery unit 120 may be electrically connected to an onboard solar panel (not shown). In this way, the solar panel may convert the solar energy into electric energy and charge the rechargeable battery unit 120 accordingly as necessary. This is particularly useful when the vehicle may have been parked for an extended period of time and as such the engine has not been running either. In certain other embodiments, the rechargeable battery unit 120 may be charged via external power such as household power.

Alternatively, the VOC reducer 110 may also be in direct electrical connection to the generator 160 of the vehicle 10. In this way, the electric energy from the generator 160 may be used to directly power the VOC reducer 110 and as such unnecessary over-use of the rechargeable battery unit 120 may be avoided to preserve the life span of the rechargeable battery unit 120.

Referring back to FIG. 1B, the VOC reducer 110 may further include a ventilator in fluid communication with cabin air 12, thereby purifying the cabin air and reduce or eliminate the VOC therein. The VOC reduction system 100 may also include a receiver 130, which is optionally positioned inside the vehicle 10 and to receive the commands from the transmitter 140. The transmitter 140 may be in wireless connection with the receiver 130, via any suitable connection methods including Bluetooth and infrared connection. In certain instances, the receiver 130 may be a built-in component to the VOC reducer 110, the VOC sensor 150, or both.

Referring back to FIG. 1B, the VOC reduction system 100 may further include at least one VOC sensor 150, which may detect the VOC concentration in the cabin air 12. A non-limiting example of such sensors may be commercially available from the company "RAE System" by the product name of PGM-7320. Optionally, the rechargeable battery unit 120 may power the VOC sensor 150. Optionally also that the at least one VOC sensor 150 may be directly powered by the vehicle storage battery especially when the VOC sensor 150 is of a low power consumption design.

Further, and as illustratively depicted in FIG. 1B, the VOC sensor 150 may include a signal output unit 180, which is connected to the VOC reducer 110 optionally wirelessly to provide a VOC concentration signal 185. In one embodiment, the signal 185 may be in wired connection with the VOC reducer 110 to transmit the VOC concentration signal 185. Any suitable methods may be used to establish the wireless connection between the signal output unit 185 and the VOC reducer 110, with non-limiting examples thereof including Bluetooth connection and infrared connection.

Figure 2:
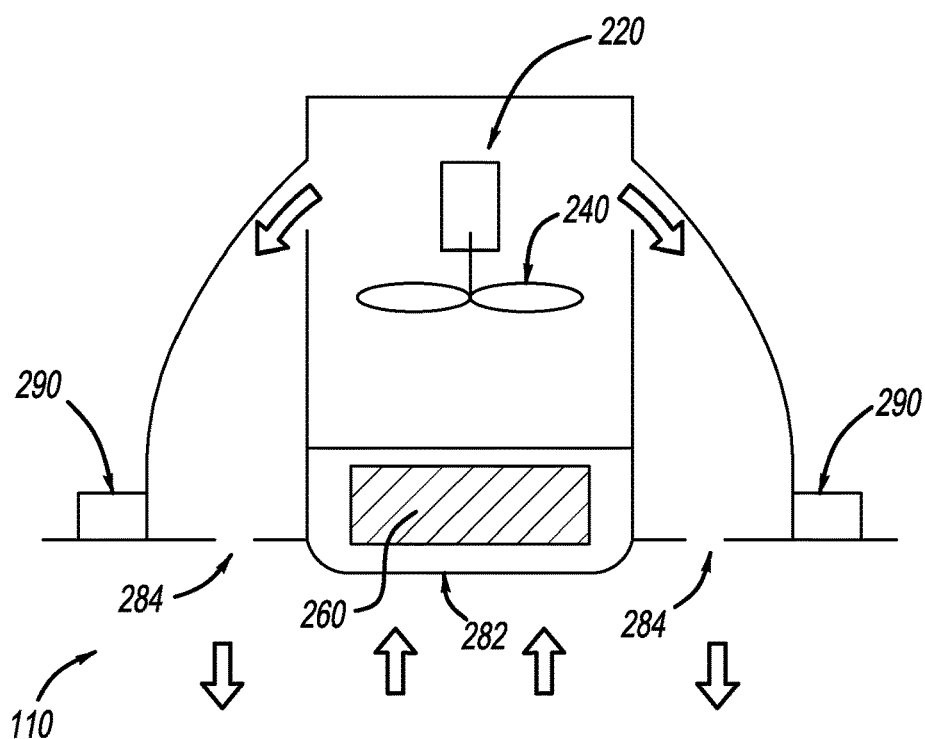
FIG. 2 illustratively depicts an enlarged cross-sectional view of a VOC reducer of the VOC reduction system referenced in FIG. 1A or FIG. 1B.

FIG. 2 illustratively depicts the VOC reducer 110 according to one or more embodiments, wherein the VOC reducer 110 may include a housing 280, an air inlet 282, and an air outlet 284 formed at the housing 280. The air inlet 282 and/or the air outlet 284 may vary in number per any given VOC reducer 110.

Referring back to FIG. 2, the VOC reducer 110 may further include one or more fan blades 240 and electric motor 220. The rechargeable battery unit 120 may be in electrical connection to the electric motor 220 and provides power for operation. The electric motor 220 may drive the fan blades 240 to rotate such that air may be forced into the VOC reducer 110 via the air inlet 282, subsequently processed through a VOC absorbing layer 260 to form processed air, and then the processed air may exit through the air outlet 260.

In one or more embodiments and as illustratively depicted in FIG. 2, the VOC absorbing layer 260 may be disposable as positioned within the housing 280 of the VOC reducer 110. In this way, the user may replace it during maintenance service as needed. The VOC absorbing layer 260 may also be replaced by an operator of the vehicle 10 as needed. Various absorbing material may be used for the VOC absorbing layer 260, including but not limited to activated carbon, charcoal, silica gel, alumina oxide, or any other suitable materials for absorbing VOC.

The VOC reducer 110 may further be provided with a connector 290 positioned on a side wall of the housing 280. The VOC reducer 110 may be connected to the roof of the vehicle 10 via the connector 290. The connector 290 may be positioned at any other suitable location of the VOC reducer 110, and the VOC reducer 110 may be positioned at any suitable location inside the vehicle 10 via the connector 290 where VOC emissions may likely be concentrated and hence the need for VOC reduction may be particularly imminent. For example, the connector 290 may connect the VOC reducer 110 to the B-pillar (not shown) of the vehicle 10, such that it may provide relatively enhanced protection to the driver because the B-pillar and hence the VOC reducer 110 is often positioned close to the head of the driver. Similarly, the VOC sensor 150 may also include a connector for connection to the roof of the vehicle 10, thereby the overall VOC condition in the cabin may be detected via one single sensor. In certain other embodiments, more connectors may be used to connect more of the VOC sensors to the vehicle. In other embodiments, at least one of the VOC reducer 110 and the VOC sensor 150 may be connected to the air outlet of an air conditioner (not shown) of the vehicle 10. In this way, the cabin air may be well detected and treated at least because the air flow there tends to be relatively high.

Figure 3:
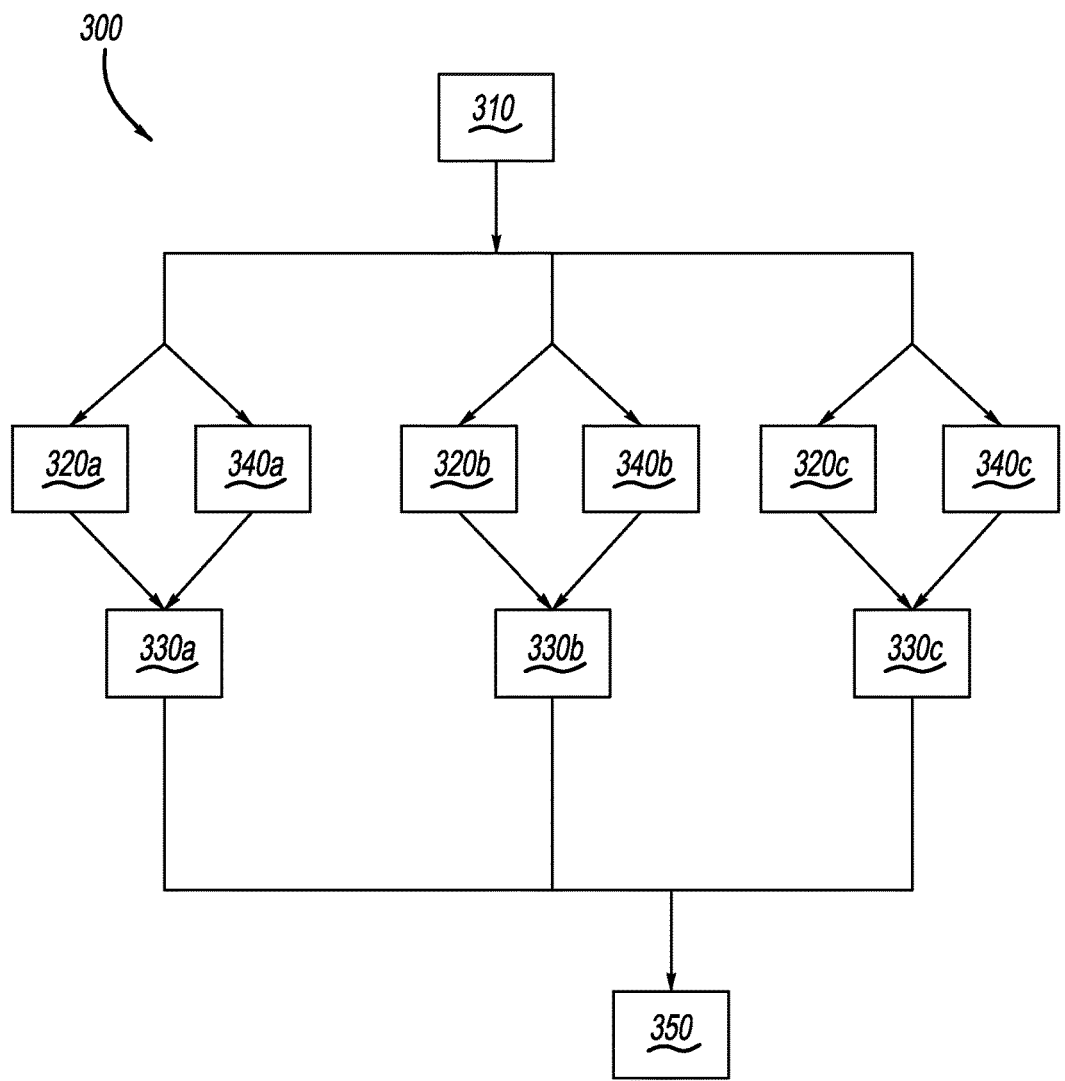
FIG. 3 illustratively depicts an operation flow chart using the VOC reduction system referenced in FIG. 1A, FIG. 1B and/or FIG. 2.

FIG. 3 illustratively depicts an operating process 300 of the VOC reduction system 100 according to one or more embodiments. As mentioned herein elsewhere, one or more VOC sensors 150 and one or more VOC reducers 110 may be employed. For brevity, three VOC reducers 110 are employed and as indicated at steps 330a, 330b and 330c.

At step 310, an operating command from the transmitter 140 is received. For example, the operating command may include but not limited to a start command, a termination or stop command, or an adjustment or modification command. The operating command may be transmitted by the transmitter 140 based on user's own judgment and/or preference and does not have to follow any particular rules or be based on any readings of parameters. For instance, the user may find a particular need to start the VOC reduction operation due to the fact the vehicle 10 is brand new, or that the vehicle 10 has just recently been under interior service work where new interior trims have been installed. Once the operating command is received, one or more of the steps 330a, 330b and 330c may be activated via separable control steps 320a, 320b and 320c, respectively. For brevity, steps 320a, 320b, and 320c are illustratively described. Similar operations may follow at steps 320b/c, 330b/c, and 340b/c.

The process 300 may further include determining whether the start command from the transmitter 140 is received at step 320a. If yes, the process 300 proceeds to step 330a.

Figure 4:
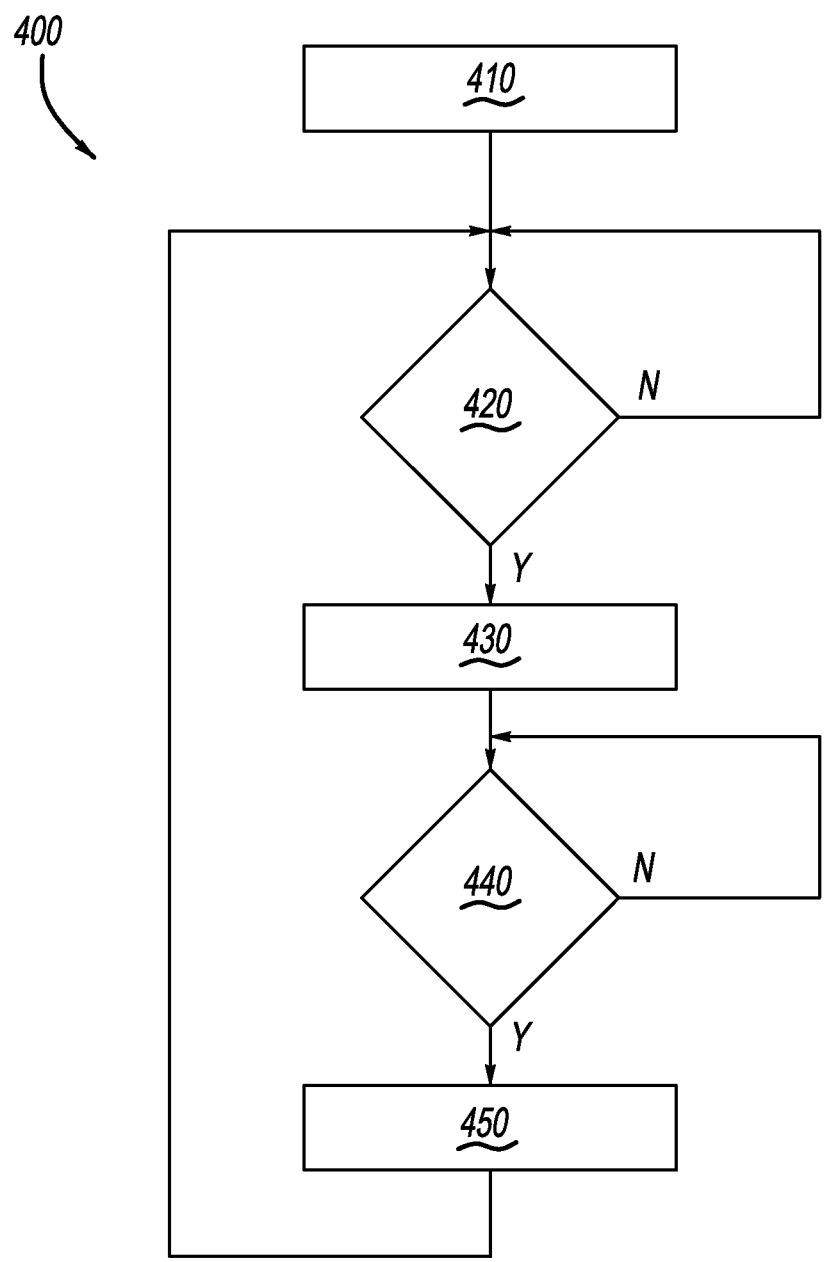
FIG. 4 illustratively depicts a process flow routine in connection with the operation flow chart referenced in FIG. 3.

At step 330a, the VOC reduction system 100 may start and process the VOC reduction routine 400 as illustratively depicted in FIG. 4. The VOC reduction routine 400 remains in operation unless and until the termination or stop command from the transmitter 140 is received.

The process 300 may further include determining whether the termination or stop command from the transmitter 140 is received at step 340a. If yes, the process 300 proceeds to step 350.

At step 350, the process 300 terminates.

FIG. 4 illustratively depicts details generally shown at 400 in relation to steps 330a, 330b, and/or 330c referenced in FIG. 3.

At step 410, the VOC sensor 150 may keep monitoring the VOC concentration in cabin air and provide VOC concentration signal to the VOC reducer 110 unless and until termination command is received at step 350.

The process flow 400 may further include step 420, at which it is determined whether the VOC concentration is higher than a first predetermined threshold. If the VOC concentration as detected is not higher than the first predetermined threshold value, step 420 is repeated. On the other hand, and if the VOC concentration as detected is higher than the first predetermined threshold value, the process flow 400 proceeds to step 430. The first predetermined threshold value may be any suitable value that is initially set by the vehicle manufacturer (OEM) or a maker of the VOC reduction system 100. Optionally, the first predetermined VOC value may also be set by the user as suitable.

At step 430, VOC reduction is carried out via the VOC reducer 110 to reduce VOC content or concentration in the cabin air of the vehicle 10, unless and until a termination command is received at step 350 referenced in FIG. 3 or step 450 referenced in FIG. 4.

The routine 400 may further include determining whether the VOC concentration is lower than a second predetermined threshold value according to the VOC concentration signal at step 440. If the VOC concentration is not lower than the second predetermined threshold value, the step 440 may repeat. And if the VOC concentration is indeed lower than the second predetermined threshold value, the routine 400 may proceed to step 450. Similar to the first predetermined threshold value, the second predetermined threshold value may be any suitable value that is initially set by the vehicle manufacturer (OEM) or a maker of the VOC reduction system 100. Optionally, the second predetermined VOC value may also be set by the user as suitable.

In certain embodiments, the second predetermined threshold is lower than the first predetermined threshold. During operation, the VOC concentration is reduced until it becomes lower than the second predetermined threshold value. When the VOC concentration becomes lower than the second predetermined threshold value, then the VOC reducer 110 stops its operation. Subsequently the VOC concentration as detected may again increase and exceed the first predetermined threshold value, and at that point, operation of the VOC reducer 110 may start again. The first and second predetermined thresholds may have same or similar values as desirable and needed.

At step 450, the VOC reducer 100 is at pause and the routine 400 returns back to step 420.

The process 300 and routine 400 may each be independently controlled by a controller or control circuit (not shown) of the VOC reduction system 100.

As described above, the VOC reduction system 100 for vehicle has been described and illustrated in the relation to VOC. However, it is to be understood that the VOC reduction system 100 may also be used to reduce or eliminate any other unwanted compositions such as smoke, odor, and PM2.5.

As stated herein elsewhere, the present invention in one or more embodiments provides a VOC reduction system for a vehicle. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A VOC (volatile organic compounds) reduction system for a vehicle, comprising:

a VOC reducer to be in fluid communication with an interior of the vehicle;

a rechargeable battery unit to at least partially power the VOC reducer, wherein the rechargeable battery unit is independent of a built-in power system of the vehicle; and a transmitter to transmit operation commands to the VOC reducer, wherein the transmitter is positioned on a key chain for a key to the vehicle.

2. The VOC reduction system of claim 1, wherein the rechargeable battery unit is to be in electrical connection with a generator of the vehicle.

3. The VOC reduction system of claim 1, wherein the VOC reducer is to be in direct, electrical connection with a generator of the vehicle.

4. The VOC reduction system of claim 1, wherein the VOC reducer includes one or more fan blades, a housing to enclose the fan blades and the VOC reducer, an air inlet, an air outlet, and a VOC absorber positioned at least partially between the one or more fan blades and the air inlet, and wherein the air inlet and the air outlet are disposed at a same side of the housing.

5. The VOC reduction system of claim 4, wherein the VOC absorber includes a disposable VOC absorbing layer.

6. The VOC reduction system of claim 1, wherein the transmitter is positioned on a hand-held device separable from the vehicle to enable a remote control of the VOC reducer and the rechargeable battery unit.

7. The VOC reduction system of claim 1, further comprising at least one VOC sensor.

8. The VOC reduction system of claim 7, further comprising a signal output unit in communication with the at least one VOC sensor and providing a VOC concentration signal to the VOC reducer.

9. The VOC reduction system of claim 7, further comprising a connector for connecting at least one of the VOC reducer and the VOC sensor to a roof of the vehicle.

10. The VOC reduction system of claim 7, further comprising a connector to connect at least one of the VOC reducer and the VOC sensor to a B pillar of the vehicle.

11. The VOC reduction system of claim 7, further comprising a connector to connect at least one of the VOC reducer and the VOC sensor to an air conditioner of the vehicle.

12. A VOC (volatile organic compounds) reduction system for a vehicle, comprising:

a VOC reducer to be in fluid communication with an interior of the vehicle;

a rechargeable battery unit to at least partially power the VOC reducer; and a transmitter to transmit operation commands to the VOC reducer, the transmitter being a hand-held device positioned on a key chain for a key to the vehicle.

13. The VOC reduction system of claim 12, further comprising a VOC sensor and a connector, the connector to connect at least one of the VOC reducer and the VOC sensor to a roof of the vehicle.

14. The VOC reduction system of claim 12, further comprising a VOC sensor and a connector, the connector to connect at least one of the VOC reducer and the VOC sensor to a B pillar of the vehicle.

15. The VOC reduction system of claim 12, further comprising a VOC sensor and a connector, the connector to connect at least one of the VOC reducer and the VOC sensor to an air conditioner of the vehicle.

16. A vehicle with a VOC (volatile organic compounds) reduction system, comprising:

a VOC reducer in fluid communication with an interior of the vehicle;

a rechargeable battery unit at least partially powering the VOC reducer; and a transmitter transmitting operation commands to the VOC reducer, the transmitter being a hand-held device positioned on a key chain for a key to the vehicle.

17. The vehicle of claim 16, wherein the rechargeable battery unit is in electrical connection with a generator of the vehicle.

18. The vehicle of claim 16, wherein the VOC reducer is in direct, electrical connection with a generator of the vehicle.

* * * * *